United States Patent [19]

Curry

[11] Patent Number: 4,941,703
[45] Date of Patent: Jul. 17, 1990

[54] TRUCK RAMP STORAGE SYSTEM

[75] Inventor: William J. Curry, Tempe, Ariz.

[73] Assignee: U-Haul International, Phoenix, Ariz.

[21] Appl. No.: 335,746

[22] Filed: Apr. 10, 1989

[51] Int. Cl.$^5$ .............................................. B60P 1/43
[52] U.S. Cl. .................................... 296/37.6; 296/50;
414/537; 292/100; 292/118; 292/DIG. 43
[58] Field of Search ................ 296/37.6, 50; 414/537;
14/71.1; 292/100, 118, DIG. 43

[56] References Cited

U.S. PATENT DOCUMENTS

| | | | |
|---|---|---|---|
| 1,717,303 | 6/1929 | Barclay | 414/537 |
| 2,058,682 | 10/1936 | Green | 414/537 |
| 3,476,425 | 11/1969 | Chartrand | 292/100 X |
| 3,511,393 | 5/1970 | Abromavage et al. | 414/537 |
| 3,893,722 | 7/1975 | Galbreath et al. | 292/100 |
| 4,601,632 | 7/1986 | Agee | 14/71.1 X |
| 4,678,212 | 7/1987 | Rubio | 292/DIG. 43 X |

Primary Examiner—Dennis H. Pedder
Attorney, Agent, or Firm—Cahill, Sutton & Thomas

[57] ABSTRACT

A mechanism for preventing removal of a ramp from its storage space beneath the floor of a truck body when the door for the truck body opening is latched closed. The ramp is insertable into and is removable from the ramp storage space through an opening beneath the truck body opening. The door latching mechanism includes a latch bolt movably mounted on the door and engagable with a catch pin in the truck body floor. The latch bolt carries a pawl which is engagable with a portion of the ramp to prevent removal of the ramp when the ramp is properly stored. The pawl also prevents the latch bolt from engaging the catch pin if the ramp is improperly stored.

3 Claims, 1 Drawing Sheet

U.S. Patent    Jul. 17, 1990    4,941,703

TRUCK RAMP STORAGE SYSTEM

TECHNICAL FIELD

This invention is concerned with the security and safety with which a ramp for loading and unloading a truck is stored within the truck.

BACKGROUND ART

It has been common practice for sometime in the truck rental industry to supply a ramp with the truck to facilitate loading and unloading the truck. A significant advance was made in this art when the inventors recognized the possibility of providing a storage space for the ramp beneath the truck floor between the longitudinal frame members of the truck chassis.

Storage of the ramp in the frame of the truck offers several advantages. Such storage is outside the body of the truck and therefore does not occupy valuable cargo space nor interfere with articles stored in the truck body. Furthermore, this storage arrangement positions the ramp at the rear of the truck immediately beneath the floor of the truck body where it is accessible to the user who merely needs to withdraw the ramp from its storage space and place it in use.

Representative prior art arrangements for frame storage of ramps are disclosed in a series of three U.S. Patents granted to John C. Abromavage and Henry S. Shattles, namely: U.S. Pat. Nos. 3,511,393 granted May 12, 1970 for "RAMP ASSEMBLY"; No. 3,559,826 granted Feb. 2, 1971 for "AUTOMOTIVE CHASSIS"; and 3,713,662 granted Jan. 30, 1973 for "CHASSIS WITH STORAGE SPACE".

All of the aforementioned Abromavage et al patents disclose releasable latches for locking the ramp in its stored position to prevent accidental dislodgement of the ramp when the truck is moved. There are no provisions, however, for locking the latches themselves. Consequently, with the arrangements of the '826 and '662 patents the ramps are exposed to theft when the truck is left unattended. In the '393 patent a rather elaborate and costly set of pivoted arms prevent the ramp from becoming completely detached from the truck.

Theft of loading ramps has become a major problem for truck rental fleets. For ease of handling such ramps are usually made of aluminum which has considerable scrap metal value and encourages theft.

Now, it has long been the practice to provide a lockable latch for the access door of rental trucks. U.S. Pat. No. 3,740,978 granted June 26, 1973 to Vernon O. Smith et al for "LATCH AND LOCK STRUCTURE" discloses such a latch.

So far as is known, however, the door latch lock has not been employed to secure and prevent theft of a loading ramp aside from locking the ramp inside the cargo space. And the latter expedient uses valuable cargo space.

DISCLOSURE OF THE INVENTION

This invention interconnects the door latch and a ramp movement blocking member in such a manner that when the door is latched the ramp, if properly stored, is blocked against removal from its storage space beneath the floor of the truck. When the user locks the door latch he automatically locks the ramp in storage. A further feature of this interconnection is that improper storage of the ramp prevents engagement of the door latch thus providing the user with a warning that the ramp is improperly stored.

BRIEF DESCRIPTION OF THE DRAWING

The invention is disclosed in greater detail hereinafter by reference to the accompanying drawing wherein:

FIG. 4 is a fragmentary view similar to FIG. 2 but showing the latch mechanism in a different position.

BEST MODE FOR CARRYING OUT THE INVENTION

Figure 1:
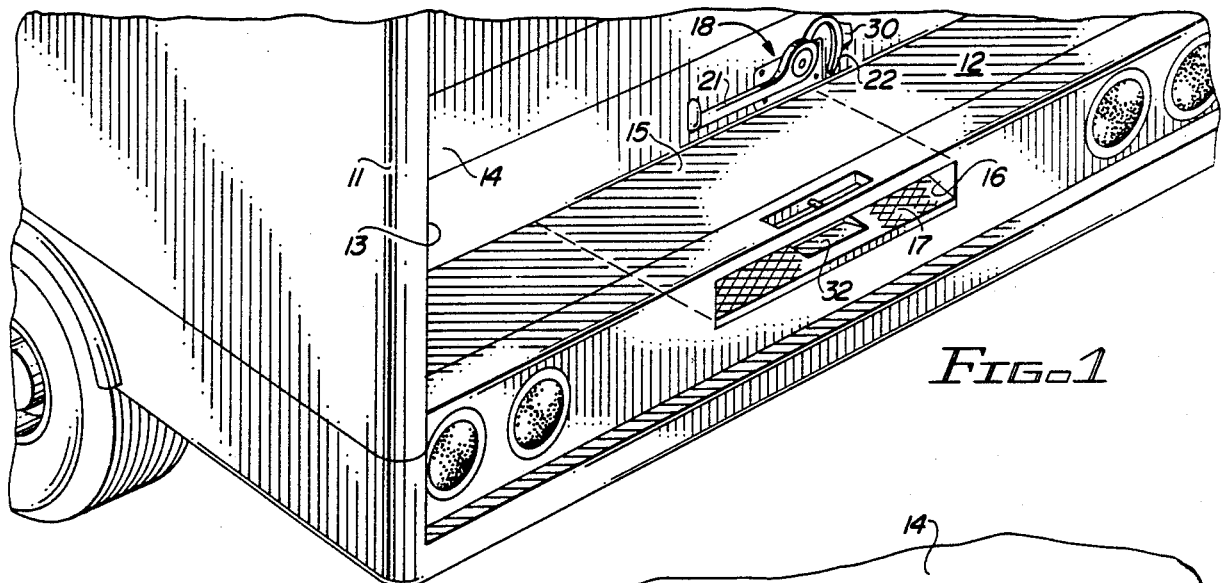
FIG. 1 is a fragmentary perspective view of the rear end of a truck equipped with this invention.

Referring particularly to FIG. 1, the reference numeral 11 designates a truck body having a cargo storage space 12 therein. Access to the storage space 12 is provided by a rear opening 13 in the truck body which is opened and closed by an upwardly acting door 14.

Cargo storage space 12 has a floor 15 beneath which is a storage space 16 for a loading and unloading ramp 17. Storage space 16 is open at its rear end to permit ramp 17 to be slid rearwardly of the truck and out of the storage space. In use, one end of the ramp 17 rests on the rear edge of the cargo space floor 15 and the other end rests on the ground. After the truck is loaded or unloaded the ramp 17 is returned to its storage space 16.

A typical storage ramp 17 is some 180 inches long by 24 inches wide and comprises some 100 pounds of aluminum. As such it is a tempting objective for theft simply for its scrap value. The principal objective of this invention is the prevention of theft of these ramps. This is accomplished by modifying the door latch mechanism customarily provided for the cargo space access door 14.

The door latch mechanism is identified generally in the drawing by reference numeral 18. The latch mechanism 18 comprises a latch bolt 19 pivotally carried by a mounting plate 20 secured to the door 14 near its lower edge. Latch bolt 19 is manipulated by a handle 21 which is also pivotally mounted on plate 20. Handle 21 and latch bolt 19 of latch mechanism 18 are movable from an open, or unlatched, position shown in FIG. 1 to a closed, or latched, position shown in FIG. 2.

When the latch mechanism 18 is latched a hook 22 on latch bolt 19 is positioned beneath a catch pin 23 carried in the chamber of a rectangular casing 24 imbedded in the floor 15 of the cargo storage area. Hook 22 has a slightly cammed inner surface 25 which causes the door 14 to be drawn down tightly against the floor 15 when the latch mechanism 18 is swung to its latched position and the hook engages catch pin 23.

Figure 2:
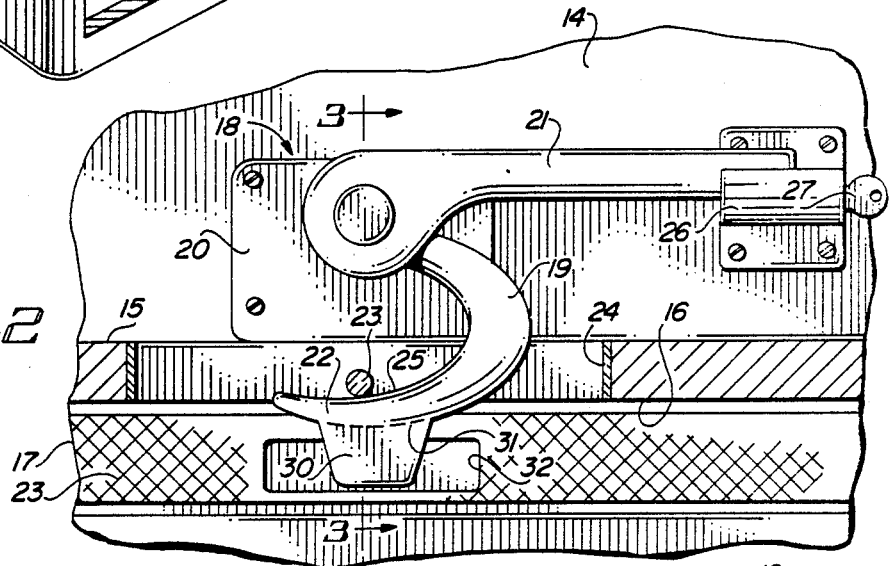
FIG. 2 is an enlarged elevational view of the door latch mechanism embodying this invention.

Latch mechanism 18 may be locked in its latched position by a lock 26 which engages handle 21 and holds it in the latched position shown in FIG. 2. Latch 26 is manipulated by a removable key 27.

The latch mechanism 18 thus far described is conventional and resembles in large measure the latch mechanism disclosed in the aforementioned Smith et al '978 patent.

In accordance with this invention the latch mechanism 18 is modified to interconnect that mechanism with means for preventing removal of the ramp 17 if it has been properly stored and the latch mechanism is latched. This is accomplished by the simple expedient of providing a ramp blocking pawl 30 on the outer surface 31 of latch hook 22. With latch hook 22 in its latched position (FIG. 2) pawl 30 extends downwardly from the hook, out the bottom of catch pin casing 24 and into the ramp storage space 16. In this position pawl 30 is received in a recess, or detent, 32 in the beveled rear edge 33 of ramp 17 and prevents rearward movement of the ramp. With latch mechanism locked by lock 26 ramp 17 cannot accidentally or intentionally be removed from its storage space 16.

Figures 3, 5:
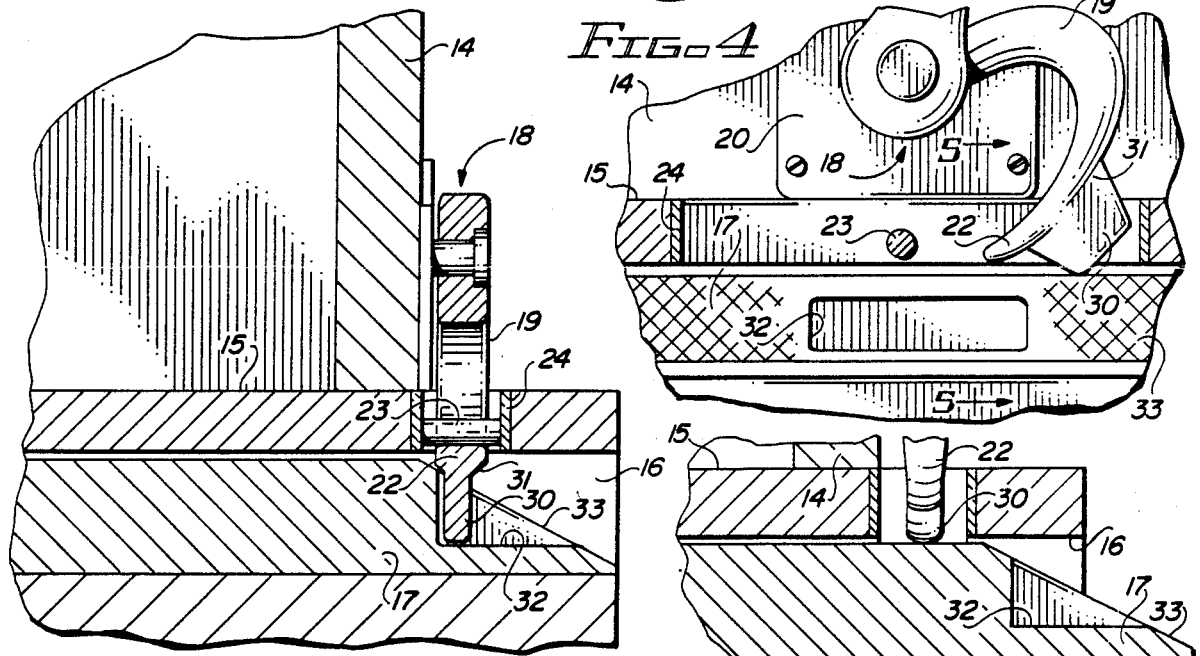
FIG. 3 is a vertical sectional view taken as indicated by line 3—3 in FIG. 2.
FIG. 5 is a vertical sectional view taken generally as indicated by line 5—5 in FIG. 4.

The interconnection described above also gives a warning to the user that he has not properly stowed the ramp 17 in its storage space 16. If the ramp 17 is only partially inserted into space 16 so that the condition illustrated in FIGS. 4 and 5 exists the pawl 30 will strike the main body of the ramp 17 preventing the latch mechanism 18 from being latched. When the latch mechanism 18 is jammed open the user knows that he has not properly stored the ramp. Only with the ramp fully in place in compartment 16 will the detent 32 be in proper position to allow hook 22 to swing beneath pin 23 and latch the door closed.

What is claimed is:

1. The combination of a truck body having a loading opening therein giving access to a cargo space with a floor, a door for closing said opening, a latching mechanism for latching said door in its closed position, said latching mechanism comprising a latch bolt movably mounted on the door and a catch pin on said floor, a ramp storage space beneath said floor having an opening beneath said loading opening, a ramp insertable into and removable from said ramp storage space through the storage space opening, and a pawl on said latch bolt engagable with said ramp when the latch bolt is in engagement with said catch pin for preventing removal of said ramp from said ramp storage space.

2. The combination of a truck body having a loading opening therein giving access to a cargo space therein, a door for closing said opening, a latching mechanism for latching said door in its closed position, said latching mechanism comprising a latch bolt movably mounted on the door and a catch pin on said truck body, a ramp storage space open to the exterior of said truck body, said storage space having its opening closely adjacent the loading opening in the truck body, a ramp insertable into and removable from said ramp storage space through the storage space opening, and a pawl on said latch bolt engagable with said ramp when the latch bolt is in engagement with said catch pin for preventing removal of said ramp from said ramp storage space.

3. The combination set forth in claim 2 further characterized in that said ramp is engagable by said pawl to prevent said latch bolt from engaging said catch pin when the ramp is not fully stored in said ramp storage space.

* * * * *